No. 888,126. PATENTED MAY 19, 1908.
T. H. SMITH.
VALVE MECHANISM FOR AIR COMPRESSORS.
APPLICATION FILED AUG. 12, 1907.
2 SHEETS—SHEET 1.
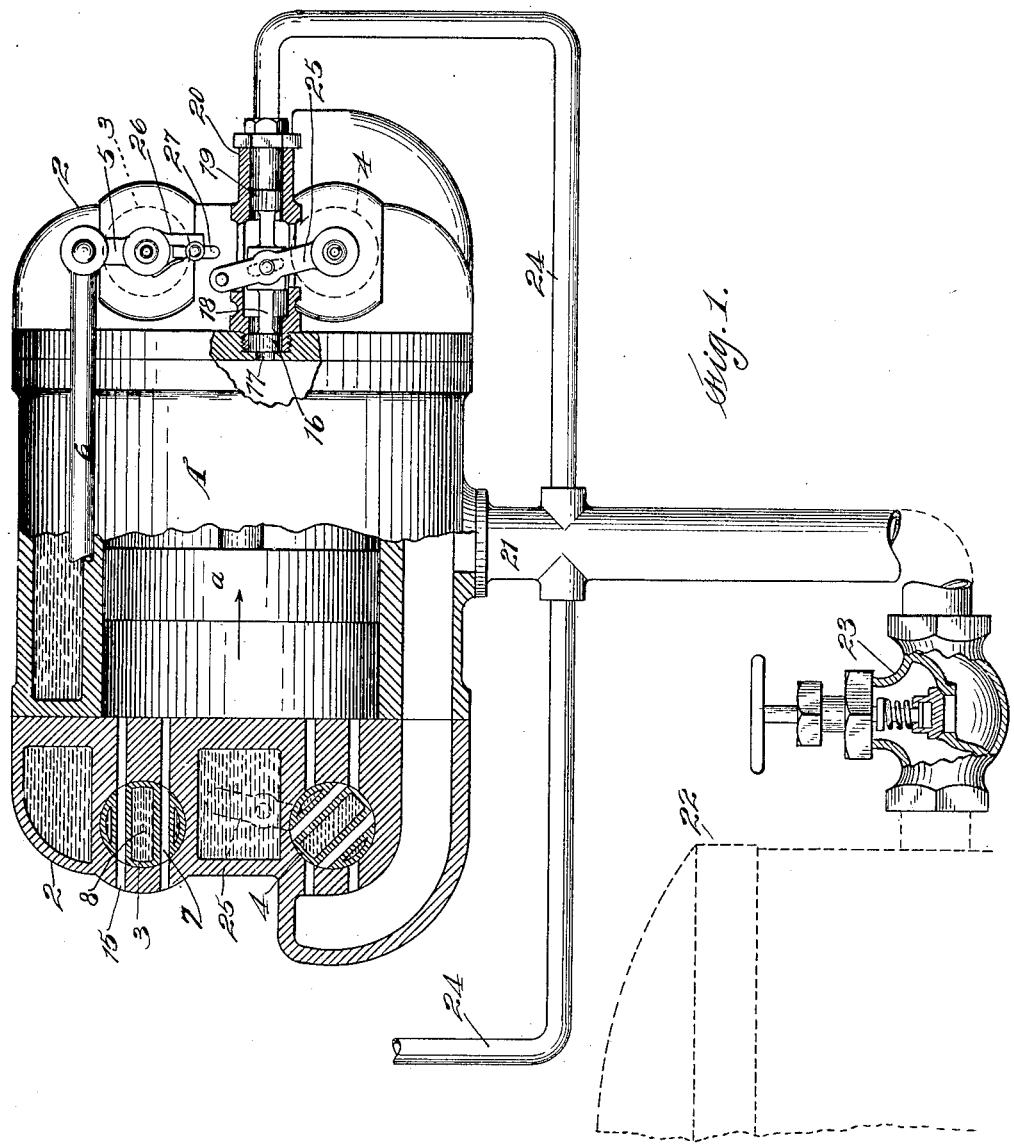
WITNESSES
INVENTOR
Theodore H. Smith
BY Geo. H. Strong
ATTORNEY No. 888,126. PATENTED MAY 19, 1908.
T. H. SMITH.
VALVE MECHANISM FOR AIR COMPRESSORS.
APPLICATION FILED AUG. 12, 1907.
2 SHEETS—SHEET 2.
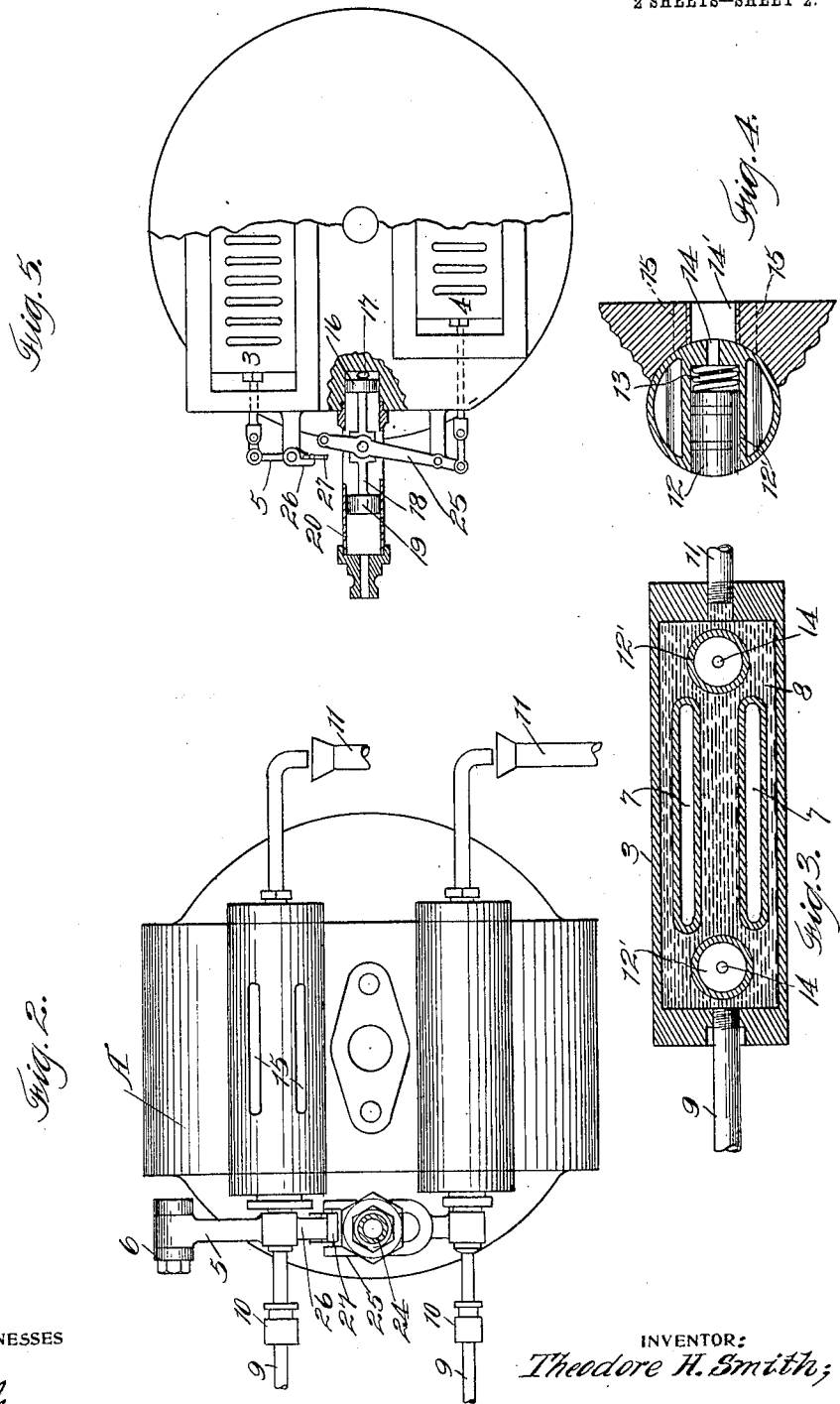
WITNESSES
INVENTOR:
Theodore H. Smith;
BY
Geo. H. Strong.
ATTORNEY

UNITED STATES PATENT OFFICE.

THEODORE H. SMITH, OF SAN FRANCISCO, CALIFORNIA.

VALVE MECHANISM FOR AIR-COMPRESSORS.

No. 888,126.  Specification of Letters Patent.  Patented May 19, 1908

Application filed August 12, 1907. Serial No. 388,162.

*To all whom it may concern:*

Be it known that I, THEODORE H. SMITH, citizen of United States, residing in the city and county of San Francisco and State of California, have invented new and useful Improvements in Valve Mechanism for Air-Compressors, of which the following is a specification.

My invention relates to air compressors, and especially to the valve mechanism thereof. Its object is to provide a novel and practical means for operating the suction and discharge valves of air compressors, whereby the opening and closing may be expedited and made contingent on the pressure within the cylinder; also to provide for cooling and counterbalancing the valves, and for clearance space; and to provide a structure generally which has endurance, simplicity, reduced resistance to incoming air, and which will be noiseless in operation.

The invention consists of the parts and the construction and combination of parts as hereinafter more fully described and claimed, having reference to the accompanying drawings, in which—

Figure 1 is a partial sectional view, vertically of the cylinder. Fig. 2 is an end view. Figs. 3 and 4 are longitudinal and transverse vertical sectional views, respectively, of an inlet valve. Fig. 5 shows the mechanism as applied to a slide valve.

A represents a compressor cylinder inclosing the usual double-acting piston *a*, and having the heads 2 in which are the respective inlet valves and outlet valves 3—4. These valves are of the Corliss type, and the stems of the inlet valves are provided with crank arms 5 which are connected by the rod 6, so that the two valves are operated simultaneously.

It is understood that each cylinder head has its respective inlet and outlet valve, and the operation of these valves is such that one inlet valve is open during the time that the other is closed.

I prefer to construct a valve of the Corliss type, as here shown, in which each valve 3 is provided with one or more air ports 7, and with the body of the valve made hollow so that a water space 8 is formed in the valve and around the ports.

Both the inlet and outlet valves are substantially alike in construction.

The valve stems are made hollow, and turn in suitable bearings in the cylinder heads. Each valve is connected through one of its stems with a water supply pipe 9, through a suitably packed bushing 10, and the other stem of the valve is adapted to drain into a discharge pipe, as 11. By thus circulating cold water from the supply pipes 9 through the valves and out to the discharges 11, the valves and their ports are kept cool, and enables a full charge of air at low temperature to be taken into the cylinder on each piston stroke.

In order to relieve the inlet valves of undue pressure during compression, and to counterbalance them so that they will turn easy, each valve is provided with two or more diametrally extending plungers 12, seating in corresponding water-jacketed bores or chambers 12' in the valve. These plungers 12 have their exposed ends curved to fit the surface of the valve seat, and their inner ends bear against a spring 13 seating in the bottom of the plunger chamber 12' in the valve.

Each chamber 12' is in communication at all times with the compressor chamber through a port 14 in the valve, and an elongated port 14' in the cylinder head. Whenever compression is taking place in that end of the compressor cylinder, the same pressure that is in the compressor is transmitted through the ports 14—14' to the chambers 12', and is exerted in opposite directions on the plungers 12 and the valves. This pressure acts through the plungers to force the valve against the opposite side of the valve seat, and since the areas of the ends of the plunger chambers 12' are slightly in excess of the exposed areas of the valve ports 15, a counterbalance effect is produced on the inlet valves. There is thus provided a counteracting pressure on the suction valves contingent on the pressure in the cylinder. As soon as the compressor stroke is complete, and the pressure has gone out of the cylinder, it has likewise gone out of the counterbalance chambers, and the valves are held up to the ports then by their springs 13. This arrangement, together with the proportion of areas just mentioned, insures absolute tightness at the time of compression, and enhances the durability of the valves and working parts.

The operation of the outlet valves 4 is made contingent on the air pressure in the cylinder, and the opening and closing of the inlet valves is contingent on the opening and closing of the outlet valves through the medium of the following mechanisms, which form important parts of the present invention:

A piston 16 operating in a suitable chamber has one end exposed through a small port 17 to the air pressure in one end of the cylinder; it being understood that there is a piston 16 and its accompanying mechanism disposed at each end of the compressor cylinder, in connection with each discharge valve. One end of a piston rod 18 is connected to the piston 16, and the other end of the rod carries a piston 19 operating in a suitable small cylinder 20, and this piston 19 is exposed to the pressure in the discharge pipe 21. This discharge pipe 21 receives the air from each end of the cylinder as discharge takes place through the valves 4, and delivers the compressed air to a suitable receiver, as indicated at 22. At some suitable point in the discharge pipe 21 there is arranged a check valve 23, which may be adjusted to open only under a certain predetermined pressure. Each cylinder 20 is connected with the discharge pipe 21 at some convenient point between the cylinder and the check valve 23 through a suitable by-pass 24. Thus it will be seen that the pistons 19 will always be exposed to a certain pressure remaining in the discharge pipe 21, and this pressure is regulated by the check valve 23.

Manifestly each by-pass could be provided with its individual check valve, if desired, in lieu of the single check valve shown.

Each piston rod 18 has a slide engaging a slot in a lever arm 25 on a corresponding outlet valve 4. Consequently when a pair of pistons 19—16 move in one direction an outlet valve will be open, and when moved in the opposite direction the outlet valve will be closed. Each arm 25 is also adapted to operate a corresponding inlet valve. As here shown, the stem of the adjacent inlet valve 3 has an arm 26 with a pivoted spring-pressed finger projecting into the path of an extension of an arm 25 of the stem of the outlet valve. When the arm 25 rocks in the direction to open an outlet port, the arm rides free beneath the spring trip 27, without operating the inlet valve. As soon, however, as the compressor piston in the cylinder A is reversed, and the pressure in that end of the cylinder is reduced, so that the check valve 23 may close, the pistons 16—19 are left in a state of unstable equilibrium, and the arm 25 is rocked in the opposite direction. In this return movement it encounters the obstruction provided by the trip 27 and rocks the inlet valves, causing the inlet valve at that end of the cylinder to open to allow a fresh charge to be taken in, and correspondingly to close the inlet valve at the opposite end of the compression cylinder.

It will be understood that the discharge valve travels twice as far as the suction valve, so that it may not fall back and trip open the suction valve, until the latter has completed its full stroke, since the air sometimes fluctuates on going out of the cylinder.

By this construction the opening of each outlet valve is made dependent on pressure in the compressor cylinder, and the opening and closing of the inlet valves are made dependent on the closing of the outlet valves. Each outlet valve, it is understood, is operated independent of the other, but the operation of the inlet valves takes place on the closing of each outlet valve. Each outlet valve makes a full opening and closing movement and operates the two inlet valves, before the other outlet valve is called on to operate.

Among the advantages of my improved construction of valve mechanism are the following:

All the air is allowed to enter the cylinder without any resistance such as is encountered in the case of puppet valves, and other valves of the Corliss type.

The air travels over water-cooled surfaces in passing through the valve, which insures a full cylinder of air at low temperature.

There is an instantaneous opening and closing of the valves, as the ports are narrow and require but a short travel.

The operation of the valves is noiseless, and the construction is such as to conduce to durability of the working parts of the suction valves.

The valves can be lubricated to good advantage.

There is no pressure on the suction valves at the time of opening and closing, and there is absolute tightness while under compression.

The discharge valves are mechanically operated through the medium of the pressure in the cylinder, so that the valves open at the most advantageous time.

This valve operating mechanism is applicable not only to valves of the Corliss type, but also to slide valves, as shown in Fig. 5.

Having thus described my invention, what I claim and desire to secure by Letters Patent is—

1. In a valve gear for air compressors, the combination of an oscillating valve having a hollow body, an air port through said body, the hollow portion of said valve forming a jacket space to said port, said valve having hollow pintles for the passage through the valve of a cooling medium, one of said pintles connected with a source of cooling fluid supply, and the other pintle forming a discharge.

2. In a valve gear for air compressors, the combination of a compressor cylinder, a valve casing, an oscillating valve in said casing, ports in the valve registering with corresponding ports which communicate with the air compressor chamber, a piston member arranged radially of the valve and seating in a chamber in the valve, a spring in the chamber to press the plunger upward against the valve casing, and a port in the valve communicating with said last-named chamber and registrable with a port which communicates with the air compressor chamber.

3. In a valve gear for air compressors, the combination of a compressor cylinder, an inlet valve, an outlet valve, a discharge pipe connecting with said outlet valve, and mechanism including a piston member exposed to the pressure in the cylinder and also to the pressure in said discharge pipe, said piston member being connected to both valves so as to actuate the latter successively.

4. In an air compressor, the combination of a compressor cylinder, an outlet valve, a discharge pipe connecting therewith, a slidable member having one portion exposed to the pressure in the discharge pipe and another portion exposed to the pressure in the cylinder, a connection between said member and one of the valves, and a connection with the other valve extending into the range of action of the first-named connection so as to be actuated by the latter.

5. In an air compressor, the combination of a compressor cylinder, an outlet valve, an inlet valve, mechanism including a piston member exposed to the medium of the pressure in the compressor cylinder to actuate said outlet valve, and means whereby said last-named mechanism will also operate the inlet valve.

6. In an air compressor, the combination of a compressor cylinder, an inlet valve, an outlet valve, said outlet valve connecting with a discharge pipe, a check valve in the discharge pipe, a double-ended piston member having one end exposed to the pressure in the discharge pipe and the other end exposed to the pressure in the pressure cylinder, and connections between said double-ended piston member and the outlet valve for operating the latter.

7. In an air compressor, the combination of a compressor cylinder, an inlet valve, an outlet valve, said outlet valve connecting with a discharge pipe, a check valve in the discharge pipe, a double-ended piston member having one end exposed to the pressure in the discharge pipe and the other end exposed to the pressure in the pressure cylinder, connections between said double-ended piston member and the outlet valve for operating the latter, and connections between said inlet valve and said double-ended piston for operating the inlet valve.

8. In an air compressor, the combination of a compressor chamber, an oscillating inlet valve, an oscillating outlet valve, a discharge pipe, a check valve in the discharge pipe, a double-ended piston member having one end exposed to the pressure in the air compressor cylinder and the other end exposed to the pressure in the discharge pipe, and an arm on the stem of one of said valves engageable and operable by said double-ended piston member.

9. In an air compressor, the combination of a compressor chamber, an oscillating inlet valve, an oscillating outlet valve, a discharge pipe, a check valve in the discharge pipe, a double-ended piston member having one end exposed to the pressure in the air compressor cylinder and the other end exposed to the pressure in the discharge pipe, and connections between said double-ended piston member and said valves for operating the latter successively.

10. In an air compressor, the combination of a compressor chamber, an inlet valve at each end, an outlet valve at each end, connections between the inlet valves, and mechanism operated through the medium of the pressure in the compressor chamber to open and close an outlet valve, and in the closing of said outlet valve to open one inlet valve and close the other.

11. In an air compressor, the combination of a compressor cylinder, a piston therein, an inlet valve and an outlet valve at each end of the cylinder, and means operative through the pressure in the compressor cylinder to open and close an outlet valve, and in the closing of said outlet valve to open the inlet valve at that end of the cylinder, and to close the inlet valve at the other end of the cylinder.

12. The combination of a cylinder, a piston therein, said cylinder having an inlet valve and an outlet valve, a movable member exposed to and operated through the medium of air pressure, for opening and closing the outlet valve, and means connecting with said movable member and the outlet valve and controlling the inlet valve.

In testimony whereof I have hereunto set my hand in presence of two subscribing witnesses.

THEODORE H. SMITH.

Witnesses:
 FRANK L. OWEN,
 S. H. NOURSE.